United States Patent Office 3,239,430
Patented Mar. 8, 1966

3,239,430
PROCESS FOR CULTIVATING AEROBIC
MICROORGANISMS
Shuichi Aiba and Hideo Kubo, Bunkyo-ku, Shiro Shirato, Suginami-ku, Shinichiro Esumi, Kitatama-gun, and Yoshio Miyazaki, Setagaya-ku, all of Tokyo, Japan, assignors to Kaken Kagaku Kabushiki Kaisha and Eiko Kasei Kabushiki Kaisha, both of Tokyo, Japan, corporations of Japan
No Drawing. Filed Feb. 7, 1963, Ser. No. 256,828
Claims priority, application Japan, Feb. 19, 1962, 37/5.685
2 Claims. (Cl. 195—109)

The present invention relates to an improvement of a process for the pure cultivating of large amounts of aerobic microorganisms. More particularly, the present invention relates to a process for preparing large amount of the pure culture of aerobic microorganisms while feeding a large amount of sterile air for a long period of time, said sterile air being prepared by use of a special means for removing microorganisms.

It is well known to produce food, medical articles, articles for the industrial use and others by cultivating microorganisms. According to present practice aerobic bacteria are cultivated by means of forced aeration and fermentation-production are efficiently and economically effected. However, one of the weak points of the above-mentioned process is that there is always a danger of making all of the product waste when the yield is lowered by infection of infectious microbes. Therefore, microorganisms or microbes employed for the production shall be prevented from mixing with infectious microbes, and the purest culture shall be carried out. Furthermore, the inside of a container employed for the production and the medium employed shall be previously sterilized. Particularly, in case of aerobic bacteria, much amount of air to be fed is required. However, a large amount of infectious microbes and spores float in the air as shown in the following Table 1, so that great labour is required for making air sterile air.

Table 1.—TEST FOR COUNTING NUMBERS OF INFECTIOUS MICROBES IN THE AIR

| Place | Time | Numbers of infectious microbes (per cubic meter of air) | Reporter |
|---|---|---|---|
| Tokyo | The early years of the Era of Meiji. | $10^4$ | Report by Eisei Shiken-jo. |
| A city of England. | 1956 | $3-9 \times 10^3$ | I. Eng. Ch. (1956). |
| In general | | $2 \times 10^3$ | Mr. Hamfree. |

Air in an amount corresponding to the volume of the culture medium is necessary in a minute. Further, aeration is carried out continuously for several days of the fermentation period. Accordingly, there is a great danger of mixing with infectious microbes.

As conventional processes for making bacteria free air for the purpose of fermentation-production in the industrial scale, various processes have been studied and carried out, which will be classified as follows:

(1) Processes for sterilization:

1-1. Chemical processes (oxone, bactericidal gases and others)

1-2. Physical processes (heating, ultrasonic wave and others)

(2) Process for removal of bacteria:

2-1. Processes of filtration (carbon powder, cotton, glass wool and others)

2-2. Processes of adsorption (electric method, washing with water and others)

Among these processes, the most general processes are 2-1, and processes of 2-2 may be employed together, from the standpoints of cost of the apparatus and practical conditions, such as difficulty of treating. A process of 2-2 is seldom used, singly.

Processes of 2-1 are characterized in that filter mediums are used. As filter mediums there are various kinds of materials. One of the most effective filter mediums is glass wool, which has the highest activity of removing infectious microbes and is rich in durability. However, even in this case, the amount of the filter medium to be used is considerable and a large space area is required. Moreover, the usable period of glass wool is at most one year, when it is continuously used, and much labour is necessary for exchanging it with new one.

The present inventors have compared many materials with glass wool, and as the result found that the pure cultivating of large amount of aerobic microorganisms may be easily and certainly carried out by feeding air from which infectious microbes are removed by passing air through layers of sponges consisting of acetal compounds mainly composed of polyvinyl alcohol and having holes of 2–200μ in diameter, said layers of sponges being manufactured in such a way as they have resistance against heat of about 100° C. to 130° C.

It has been known that sponges consisting of acetal compounds of polyvinyl alcohol are used for removal of dust. However, removal of dust is different from removal of bacteria in the following points.

(1) Most parts of dust to be removed are fine dust of 10μ in the diameter. On the other hand, infectious microbes and sporges of about 1μ in the diameter become the object.

(2) Complete removal of dust in the air is not necessary, but in case of aeration for the culture, removal in an amount of 100 percent is ideal. Because, if merely a few infectious microbes are mixed into the culture medium, fission is immediately begun and they propagate to great numbers in a short period of time.

Therefore, it is very dangerous to use filter mediums employed for preventing dust in general for removal of microorganisms. Whether said filter mediums can be used or not, and how to use them can not be decided until exact bacteriological and fermentation engineering studies are made.

(3) A filter medium to be used for removing bacteria in the culture under aeration itself, shall be sterilized in many cases. However, in case of a filter medium to be used for the purpose of preventing dust it is unnecessary. In the case where a culture of aerobic microorganisms is effected under aeration, the culture medium, the container and the inner walls of pipes connecting to said container shall be sterilized every time whenever air is fed. Moreover, the inside of an air filter is required to be sterilized, too. The sterilization is carried out by means of steam at a high temperature, so that the filter medium should have durability against steam of a high temperature.

In general, sponges mainly composed of polyvinyl alcohol, a kind of filter mediums for removing dust which are in the market, are immediately softened by hot steam, and lose the form and the function of filter mediums. Therefore, they can not be used. If sponges, mainly composed of polyvinyl alcohol, are processed in such a way as they have resistance against heat of from about 100° C. to 130° C. by means of acetalation with dialdehyde and the like, heat treatment or treating with suitable resin or both of those treatments, the weak point is gotten rid of and the object will be attained. Further, it is known that polyvinyl alcohol forms sponge-like materials under conditions in the case of acetalation of its aqueous solution, and forms porous materials capable of passing liquid materials well according to conditions such as addition agents and others. (Refer to Japanese Patents Nos. 184,298, 196,838, and 196,415.)

Sponges in form of a plate having holes of 2–200μ in the diameter, which have been produced by giving thermal resistance lest they should be softened at a temperature ranging from about 100° C. to 130° C., may remove bacteria remarkably efficiently, compared with glass wool conventionally employed. It will be more concretely explained by the following experimental examples. In this case, wind pressure which is given at the time of aeration can be well dealt with by use of a suitable auxiliary apparatus. Therefore, pressure-resistance of sponges is not of such a degree as being particularly noticed.

*Experimental Example 1.—Comparison of capacity of removing bacteria of glass wool with that of sponges mainly composed of polyvinyl alcohol*

Compressed air (1.5 kg./cm.$^2$) is introduced from a compressor into a filter tube of 20 cm. in the diameter filled with glass wool or sponge plates, mainly composed of polyvinyl alcohol. Then, compressed air is passed through said glass wool or sponge plates and the effect of removing bacteria is examined in each case. The results are shown in Table 2. However, linear velocity of the aeration is 10 cm./sec. The capacity of removing bacteria is examined from the degree of generation of infectious microbes after aeration is effected for 7 days in the sterilized culture medium.

hol do not change so much and have unchanged capacity of removing infectious microbes even though they are used for 2 years. So that, it can be judged that they may be used for a further longer period.

From these experiments it may be clarified that sponges mainly composed of polyvinyl alcohol is remarkably superior in, also, durability to glass wool.

In these experiments it has been confirmed that sponge layers, mainly composed of polyvinyl alcohol are desirable to satisfy the following conditions.

(1) They have thermal resistance against heat (in particular heating with steam) ranging from 100° C. to 130° C.

(2) The diameter of a hole is suitable to be 2–200μ or so. In case of a hole having the diameter of less than 2μ, aeration is badly carried out, and in case of a hole having the diameter of more than 200μ no effect can be attained.

If the layer is rough, it is necessary to increase the thickness a little or to use several layers at one time.

(3) As for thickness of a layer employed, it may be more than about 1/1000 of the thickness of glass wool, in the case where it is used at the same wind velocity.

(4) Against wind pressure, a suitable reinforcing apparatus in form of a wire-netting or others is desirable to be employed.

(5) In case of putting on the filter medium, it is desirable to tighten by a suitable means, for example by packing in order to prevent leakage from the surroundings.

EXAMPLE 1

A fermenter made of stainless steel, having the capacity of 600 liters, and equipped with a sparger for aeration and a stirrer in the inside, and a compressor, a pipe, and a filter tube of 500 mm. in the outside diameter and

TABLE 2

| Kinds of filter medium | Filter mediums | Thickness of the layer of filter medium, cm. | Lowering pressure of air, percent | Capacity of removing infectious microbes |
|---|---|---|---|---|
| Glass wool (eddy form). | A yarn having 10μ in the diameter. | 50 | 3 | Generation of infectious microbes. |
| Do | do | 100 | 6 | No generation of infectious microbes. |
| Sponges, mainly composed of polyvinyl alcohol. | A hole having 10μ in the diameter. | 0.3 | 0 | Do. |
| Do | A hole having 60μ in the diameter. | 2 | 0 | Do. |

The tests are repeated 10 times, but the same results are attained after all. From the results, it can be understood that sponges, mainly composed of polyvinyl alcohol having merely 0.3 cm. in thickness have bacteria-removing activity corresponding to that of glass wool 100 cm. in thickness and moreover do not lower pressure of air.

*Experimental Example 2.—Comparison of durability of glass wool with that of sponges mainly composed of polyvinyl alcohol*

In the same apparatus as employed in Experimental Example 1, each of glass wool and said sponges is sterilized by use of steam for 1 hour every time whenever the apparatus is used. The operation is repeated four times in a month. The physical properties of the filter mediums are compared with each other. Thermal resistance of sponges employed in the above case have been previously strengthened by means of acetalation or heat treatment. The diameter of a hole of the sponges is 10μ. Heating with steam is effected at 120° C.

After 12 months, glass fibers are aerated and change in quality. Further, they become weak and a part of them becomes powdery. Therefore, they can not be used for the purpose of removing infectious microbes. On the other hand, sponges mainly composed of polyvinyl alco- 500 mm. of height is used. Compressed air is introduced through said pipe and filter tube from the compressor to the fermenter. A sponge layer having holes of 10μ in diameter and 1 mm. in thickness and a sponge layer having holes of 60μ in diameter and 5 mm. in thickness are put on in the inside of the filter tube. Said sponge layers are processed in such a way as having heat resistance, which are mainly composed of polyvinyl alcohol. The outlet of the filter tube is connected with the sparger in the fermenter through a pipe.

350 liters of fermentation liquor is fed in the fermenter and steam is blown in. The temperatures of the inside of the filter tube and the pipe extending from the filter tube to the sparger, the fermentation liquor and the inside of the fermenter are raised to 120° C. After sterilization by heating for 1 hour, it is stopped to blow steam in. Then, the temperature of the fermentation liquor is lowered to 30° C. while feeding bacteria free air passed through the filter tube and an elevated pressure. Mold starters of *Aspergillus niger*, which have previously been prepared by pure culture, are inoculated under the bacteria free condition. Thereafter, cultivation is carried out with stirring and aeration. After about 72 hours, good liquid koji (submerged mold amylase) is obtained. In that case, no infectious microbes other than live mycelia of *Aspergillus niger* can be seen in the culture medium.

Furthermore, the present inventors have found that polyvinyl alcohol acetal sponges which are given resistance against hot steam by processing with synthetic resins have quite efficient activity for removing bacteria, compared with conventional filter mediums for removing bacteria. That is, the present invention relates also to a The results are shown in the following table. That is, a layer of polyvinyl acetal sponge processed has the activity of the same degree even though its thickness is 0.3–2% of the thickness of a glass fiber. No reduction of pressure of air can be seen in case of a sponge layer. Furthermore, the sponge layer has resistance against hot steam, and therefore good liquid koji (submerged mold amylase) can be fermented and produced.

| Kind of filter medium | Filter medium | Thickness of layers of filter medium | Lowering of pressure of air (percent) | Generation of infectious microbes |
|---|---|---|---|---|
| Glass fiber | A fiber has a diameter of 10μ | 50 | 3 | + |
| Do | do | 100 | 6 | − |
| Sponge processed with melamine resin. | A hole has a diameter of 10μ | 0.3 | 0 | − |
| Sponge processed with phenol resin. | A hole has a diameter of 60μ | 2 | 0 | − |
| Sponge processed with furan resin. | A hole has a diameter of 30μ | 1 | 0 | − | process for the culture of aerobic microorganisms, characterized in feeding sterile air prepared by treating air with a polyvinyl acetal porous material which is given resistance against hot steam by processing with synthetic resins.

The manufactured sponge used in the present invention, of which thickness as a filter layer is less than 1% of that in case of glass fiber, has the same or stronger activity of removing bacteria in comparison with that of glass fiber. The filter medium is cheap, and the required space area is small. Aeration resistance can hardly be seen. Moreover, the period of using said sponges continuously in sterilization with steam is the same with that of glass fiber, and it is easy to exchange this filter medium.

As synthetic resins for processing sponges, for example, melamine resin, phenol resin, furan resin and the like are especially excellent. In order to carry out particularly advantageously the process for giving sponges resistance against hot steam, the porous materials are dipped in a 5–50% solution of synthetic resins, and then the solution is removed. After the treated porous materials are dried, the materials are treated at a high temperature ranging from 100° C. to 200° C. Other means may be employed.

EXAMPLE 2

In 5 fermenters having the capacity of 600 liters equipped with a sparger for aeration and a stirrer, and connected with a pipe for introducing compressed air. On the way of the pipe, a filter tube having 500 mm. in the inside diameter is provided. Into filter tubes glass fibers in form of eddies and manufactured polyvinyl acetal sponges are placed in such a way as air fed to the fermenters passes through these filter mediums.

Into each of five fermenters, 350 liters of fermentation liquor is fed. Then, steam is blown into the insides of the filter tube and the fermenter. The fermentation liquor and the insides of the fermenter and the filter tube are heated to 120° C. and sterilized for 40 minutes. Then, it is stopped to blow steam in. They are cooled with feeding compressed air. Mold starters of *Aspergillus niger* are inoculated under the condition free from bacteria. Thereafter, culture is carried out at 28° C. for 72 hours, while stirring and aerating.

We claim:

1. In a process for cultivating aerobic microorganisms by fermentation in industrial scale employing purified and sterilized air, the improvement comprising purifying the air by passing the air through a spongy material consisting essentially of a polyvinyl acetal having holes of sizes ranging from about 2 to about 200 microns which has been treated with a thermosetting artificial resin selected from the group consisting of melamine resin, phenol resin and furan-resin whereby resistance to steam at temperatures ranging from about 100° C. to 130° C. is imparted to said spongy material.

2. In a process according to claim 1, wherein said spongy material is prepared by dipping spongy polyvinyl acetal in a 5–50 percent solution of a thermosetting resin selected from the group consisting of melamine resin, phenol resin and furan resin, removing said solution, drying the treated resin, and subjecting said treated resin to heat at a temperature ranging from about 100° C. to 200° C.

References Cited by the Examiner

UNITED STATES PATENTS

| | | | |
|---|---|---|---|
| 2,298,561 | 10/1942 | Hendrickson | 195—109 |
| 2,556,295 | 6/1951 | Pace | 55—528 |
| 2,627,494 | 3/1953 | Keko et al. | 195—96 |
| 2,654,440 | 10/1953 | Robinson | 55—524 |
| 2,689,199 | 9/1954 | Pesce | 55—528 |
| 2,766,176 | 10/1956 | Jeffreys | 195—96 |
| 2,827,395 | 3/1958 | Jordan et al. | 177—98 |
| 2,882,997 | 8/1959 | Smith et al. | 55—524 |
| 2,920,718 | 1/1960 | Howell et al. | 55—524 |
| 3,013,950 | 12/1961 | Gavin | 195—142 |
| 3,075,888 | 1/1963 | Achorn et al. | 195—139 |
| 3,096,204 | 7/1963 | Spangler et al. | 117—98 |

OTHER REFERENCES

Rose: The Condensed Chemical Dictionary, Reinhold Pub. Corp., New York, 5th ed., pages 884 and 885, 1956.

A. LOUIS MONACELL, *Primary Examiner.*

A. E. TANENHOLTZ, *Assistant Examiner.*